United States Patent
Guerra, Jr.

[11] Patent Number: 5,233,649
[45] Date of Patent: Aug. 3, 1993

[54] TELEPHONE RINGING MODULE

[76] Inventor: Roy H. Guerra, Jr., c/o Philadelphia Electric Company, 2301 Market St., P.O. Box 8699, Philadelphia, Pa. 19101

[21] Appl. No.: 575,124

[22] Filed: Aug. 30, 1990

[51] Int. Cl.[5] ............................................. H04M 1/00
[52] U.S. Cl. .................................. 379/372; 379/373; 379/413
[58] Field of Search .............. 379/387, 398, 399, 372, 379/373, 377, 380, 382, 413

[56] References Cited

U.S. PATENT DOCUMENTS

| | | |
|---|---|---|
| 3,746,795 | 7/1973 | Fitzsimons . |
| 3,763,320 | 10/1973 | Chambers, Jr. . |
| 3,781,480 | 12/1973 | Roge . |
| 3,886,321 | 5/1975 | Krasin et al. ......................... 379/372 |
| 3,899,644 | 8/1975 | Hunt ..................................... 379/373 |
| 4,174,467 | 11/1979 | Ferrieu . |
| 4,276,448 | 6/1981 | Embree . |
| 4,500,844 | 2/1985 | Lisco . |
| 4,524,245 | 6/1985 | Littlefield .......................... 374/373 |
| 4,536,619 | 8/1985 | Hamatani et al. .................. 379/372 |
| 4,653,088 | 3/1987 | Budd et al. ......................... 379/413 |
| 4,677,660 | 6/1987 | Yoshida ............................... 379/373 |
| 4,723,275 | 2/1988 | Hirth . |
| 4,741,031 | 4/1988 | Grandstaff . |
| 4,827,503 | 5/1989 | Takato . |
| 4,920,561 | 4/1990 | Mitchell ............................. 379/373 |

Primary Examiner—James L. Dwyer
Assistant Examiner—M. Shehata
Attorney, Agent, or Firm—Paul & Paul

[57] ABSTRACT

A multiple phone ring boost circuit rings multiple subscriber telephones synchronized with a ring signal sent from a telephone company central office is connected to multiple subscriber telephones. A local generator creates a local ring signal, and a local generator sensing circuit determines if the local generator is functioning properly. A ring sensing circuit senses if a ring signal is being received. A switch connects the line leads to the subscriber leads in a first position, and connects the local generator to the subscriber leads in a second position. A control circuit varies the switch between the second and first positions. When the ring sensing circuit detects an incoming ring signal and the local generator sensing circuit detects a properly functioning local generator, the switch is placed in its second position. When the ring signal pauses, the control circuit places the switch in the first position. When a receiver of a subscriber telephone set is lifted off its switch hook, an increased load is placed on the local generator causing the control circuit to switch back to the first position.

7 Claims, 2 Drawing Sheets

TELEPHONE RINGING MODULE

BACKGROUND OF THE INVENTION

1. Field of the Invention

This invention relates generally to telephone communication circuitry, and more particularly to circuitry designed for boosting an incoming ringing signal to ring several telephones on the same line.

2. Brief Description of the Prior Art

Telephone signals are sent from the telephone company's central switching office over the central switching office lines to a subscriber's telephone. The subscriber may have one or more telephones connected to a single line. Each telephone introduces additional resistance to the subscriber line. As a telephone ringing signal is sent from the telephone company's central switching office over the central switching office lines to the subscriber lines, its amplitude is diminished as it passes through the ringing apparatus of each telephone on the subscriber line. As more telephones are added, a point is reached where the voltage from the central switching office is no longer powerful enough to trigger the ringing mechanism of the telephones. When this happens, the telephones fail to ring even though a ring signal is being sent from the central switching office. The subscriber is therefore not aware that he is being called.

Several devices have been made to resolve this problem. There are those devices which process the incoming signal and send this processed signal to the subscriber line, and those devices which generate their own ringing signal locally and send this signal to the subscriber line.

U.S. Pat. Nos. 3,746,795, 3,763,320, 3,781,480, and 4,500,844 disclose devices which process the incoming signal from the central switching office. Each employs a different type of modulation and amplification to boost the signal received. This boosted signal is output to the subscriber line. The object of each of those devices is to amplify the signal such that the ring signal is great enough to drive numerous telephones on the subscriber line.

In the process of amplifying the signal sent from the central switching office, noise inherent in the signal is also amplified. The modulation schemes employed by each device are aimed at minimizing the noise in the signal passed onto the subscriber line.

The second group of devices, such as disclosed in U.S. Pat. Nos. 4,276,448 ("Embree"), No. 4,723,275 ("Hirth"), and No. 4,827,503 ("Takado") create a locally generated, high amplitude, ring signal which is passed on to the subscriber line.

Hirth shows a method of switching between speech and ring circuitry, a sensing means to sense when the ring signal from the central switching office is being received, and a local ring signal generating means. The Hirth device has a sensing means to determine if the local ring signal generator is functioning, but does not pass the ring signal from the central switching office on to the subscriber line in the event of a ring signal generator failure. The Hirth device is driven by a microprocessor.

Embree discloses a device which senses a ring signal and generates its own local ring signal. This ring signal can then be applied to the subscriber line. Embree has the capability of driving multiple ringers on the same subscriber line and producing multiple tones as a ring signal. The device also has circuitry to differentiate between dialing pulses and voice signals, as well as circuitry to make the device insensitive to line voltage variations. Embree discloses a device which can only drive an electro-acoustic transducer.

Takado discloses a ring signal generator which can be switched onto the subscriber line. Takado does not have a sensing circuit to determine if the central switching office is sending a ring signal. Takado discloses essentially a ring signal generator which is not responsive to an incoming ring signal from the central switching office, and must be manually switched onto the subscriber line.

U.S. Pat. No. 4,174,467 ("Ferrieu") discloses a device that senses the incoming ring signal from the central switching office, and uses this signal to synchronize a local ring generator. This local ring generator is not switched on-line, but inductively creates a ring signal on the subscriber line. Ferrieu monitors the incoming ring signal and creates a control signal which drives switches in the local ring signal generator at roughly twice the frequency of the incoming signal, to synthesize size a ring signal. This control signal is produced by means of a delta modulator sampling the incoming ring signal.

Since the central switching office line usually travels a great distance, it is prone to high power interference, such as a lightening strike. This central switching office line eventually ends at one of the telephones in the subscriber lines, introducing a possibility of passing the power through the telephone lines and injuring persons or equipment on the subscriber line. Electronic isolation means are provided in some devices to protect persons from injury and damage to equipment. U.S. Pat. No. 4,741,031 ("Grandstaff") discloses one such device. These isolation devices are designed to transmit up to a maximum power defined by the design of the device. Any power above the maximum is simply dissipated through a ground.

There is a need for a simple and inexpensive device which is capable of boosting the ring signal from the telephone company to a level which is high enough to ring several telephones on the same line. There is also a need for a device which boosts the ring signal on the subscriber line which can use a variety of differing types of local generators. This would allow the device to be adapted to ring differing types of telephones.

SUMMARY OF THE INVENTION

The present invention provides an improved multiple phone ring boost circuit. This boost circuit includes a ring signal sensing circuit which monitors at least one incoming telephone line for a ring signal being sent from a telephone company, and also includes a local generator for producing a signal for ringing at least one subscriber telephone on a subscriber line. Each subscriber telephone has a switch hook having a connect state and a disconnect state. The ring signal sensing circuit employs a pair of capacitors connected to the incoming telephone line for splitting off the AC component of the signal, and blocking the DC component. The AC component is rectified and then fed to an opto-isolator which isolates the signal, producing a DC voltage. This DC voltage is fed into a comparator and compared to a preset voltage. The comparator produces a two-state output, the first state being produced when a ring signal is received on the incoming telephone lines, and a second state when there is no signal being received.

The boost circuit employs a local generator which can produce a first trigger signal similar to that sent by the telephone company, or a second trigger signal depending on the load placed on the local generator. A local generator sensing circuit similar to the ring signal sensing circuit, having a two-state output, monitors the output of the local generator producing a first state output when the local generator produces a first trigger signal, and a second state output when the local generator produces a second trigger signal. A switching means capable of being switched between two positions by an external circuit connects the incoming telephone line to the subscriber line in the first position, and connects the local generator to the subscriber line in the second position.

When the local generator is producing the first trigger signal, and is functioning under a normal load, the local generator sensing circuit produces the first state output. When a ring signal is sent over the incoming telephone line, the ring signal sensing circuit produces the second state output. A control circuit monitors the output state of the ring signal sensing circuit and the local generator sensing circuit. When the ring signal sensing circuit and the local generator sensing circuit both produce a first state output, the control circuit triggers the switching means into the second position connecting the local generator to the subscriber line. In the event that either the ring signal sensing circuit or the local generator sensing circuit produce a second state output, the switching means is switched to the first position connecting the incoming telephone line to the subscriber line. The local generator is switched off-line when the ring signal pauses causing synchronization of the local generator trigger signal and the ring signal received on the incoming telephone line.

In the event that a subscriber picks up one of the subscriber telephone receivers off its hook while it is ringing and the switch hook goes from disconnect state to the connect state, the resistance of the subscriber line drops, causing a load to be placed on the local generator, causing the second trigger signal to be produced by the local generator. The local generator sensing circuit detects the second trigger signal and produces a second state output. The control circuit switches the switching means to the first position.

Both the ring sensing circuit and the local generator sensing circuit employ opto-isolators which limit the maximum voltage which can be sent through the circuit. This protects persons and equipment on the subscriber line.

DETAILED DESCRIPTION OF THE PREFERRED EMBODIMENTS

Figure 1:
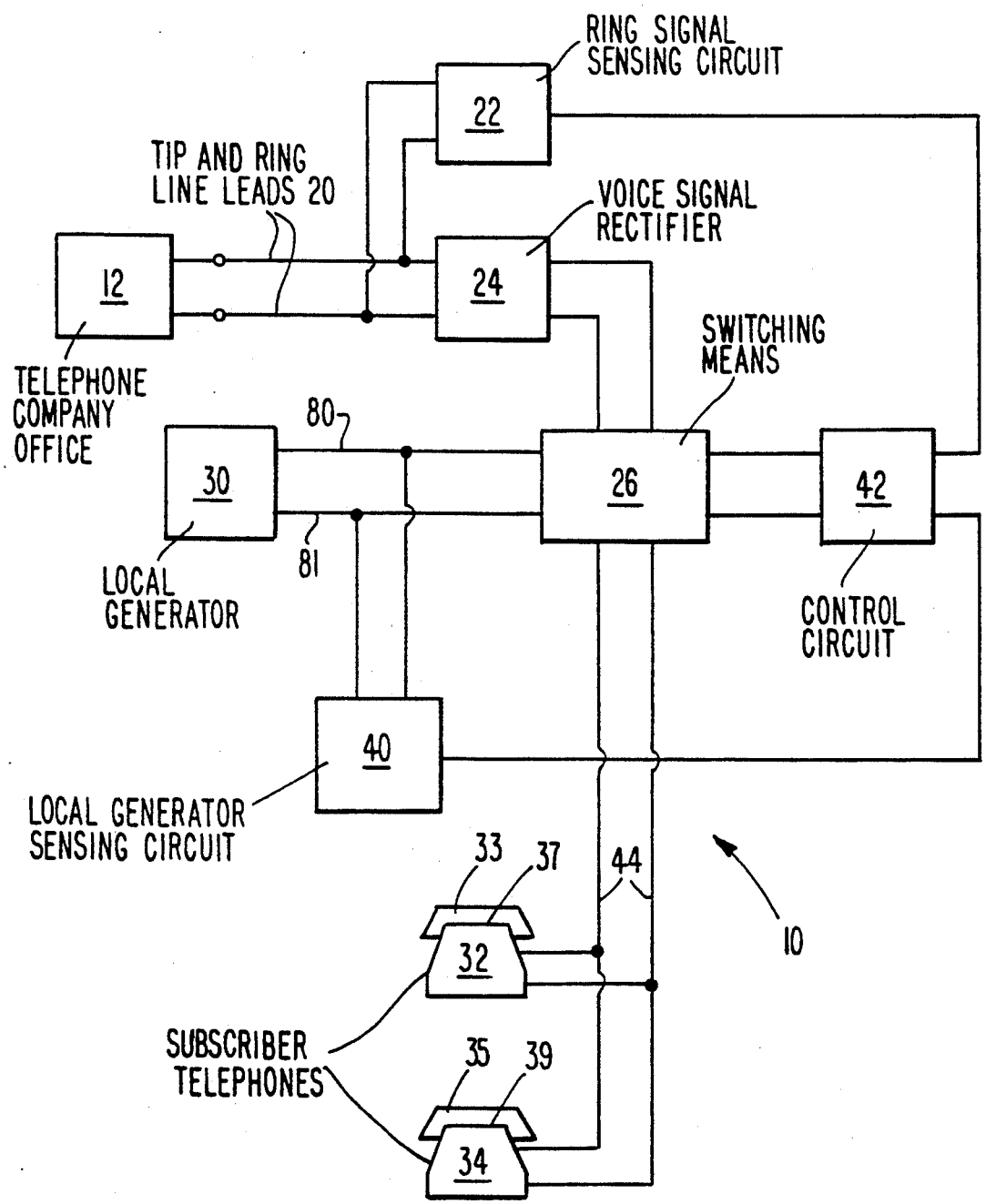
FIG. 1 is a simplified block diagram of a multiple phone ring boost circuit according to the present invention.

Referring now to the drawings in detail, wherein like reference numerals indicate like elements in each of the several views, reference is first made to FIG. 1, wherein a multiple phone ring boost circuit 10 according to the present invention is illustrated in a simplified block diagram.

A telephone signal on an incoming telephone line from a telephone company central office 12 having an AC and DC component, enters the boost circuit 10 through "tip" and "ring" line leads 20. A ring signal sensing circuit 22 is connected to the line leads 20 and monitors the incoming telephone signal for a ring signal. The ring signal sensing circuit 22 is capable of creating a two-state output, the first state pertaining to a 'high' signal and the second state pertaining to a 'low' signal. The line leads 20 also connect to a voice signal rectifier 24. The voice signal rectifier 24 rectifies the incoming telephone signal blocking the ring signal and passing the remainder of the signal, called a rectified signal, to a switching means 26. The rectified signal is a varying intensity DC signal which is compatible with subscriber telephones 32, 34. A local generator 30 produces a first trigger signal which is a continuous oscillating ring signal when the generator 30 is operating under a normal load, and a second trigger signal of reduced amplitude when operating under increased load, such as when the resistance across output leads 80, 81 is reduced significantly. The output leads 80, 81 are connected to the switching means 26.

A local generator sensing circuit 40 monitors the local generator load. The amplitude of the local generator sensing circuit 40 monitors the local generator 30 to determine if it is functioning correctly. The local generator sensing circuit 40 is capable of creating a two-state output the first state being 'high' and the second state being 'low'. If the local generator 30 is producing a first trigger signal, the local generator sensing circuit 40 will output a 'high' signal.

The output of the ring sensing circuit 22 and the local generator sensing circuit 40 are both fed into a switch control circuit 42. The control circuit 42 monitors the output of the ring sensing circuit 22 and the local generator sensing circuit 40. When both of these outputs are 'high', indicating that a ring signal is being sent from the telephone company 12 and that the local generator 30 is producing a first trigger signal, the control circuit 42 activates the switching means 26 to a second position connecting the local generator 30 to subscriber leads 44. This effectively puts the local generator 30 on-line ringing telephones 32, 34 which are attached to the subscriber leads 44.

When either the output of the ring sensing circuit 22 or the local generator sensing circuit 40 is 'low', or both are 'low', the control circuit 42 allows the switching means 26 to remain in a first position connecting line leads 20 through the voice signal rectifier 24 to the subscriber leads 44. This effectively allows a voice signal to be passed from the incoming line leads 20, through the voice signal rectifier 24, through the switching means 26, to the subscriber leads 44, and the telephones 32, 34, connected to the subscriber leads 44. This situation occurs between rings sent from the telephone company 12, or when the local generator 30 is not producing a first trigger signal. When one of the subscriber telephone receivers 33 or 35 is lifted off its switch hook 37 or 39, the switch hook 37 or 39 goes from an "on-hook" or disconnect state to an "off-hook" or connect state, and the resistance across subscriber leads 44 drops significantly.

When local generator 30 is connected to subscriber leads 44, and a subscriber telephone receiver 33 or 35 is lifted off its switch hook 37 or 39, a load is placed on local generator 30 causing it to produce the second trigger signal. This causes the control circuit 42 to switch switching means 26 to the first position. Only two telephones 32, 34 are shown in FIG. 1, but the number of telephones is only limited by the strength of the output of the local generator 30. The multiple phone ring boost circuit 10 therefore produces a trigger signal synchronized with the telephone company central office 12 ring signal that is responsive to lifting one of the subscriber telephone receivers 33 or 35 off their respective switch hooks 37 or 39 taking the local generator 30 off-line.

Figure 2:
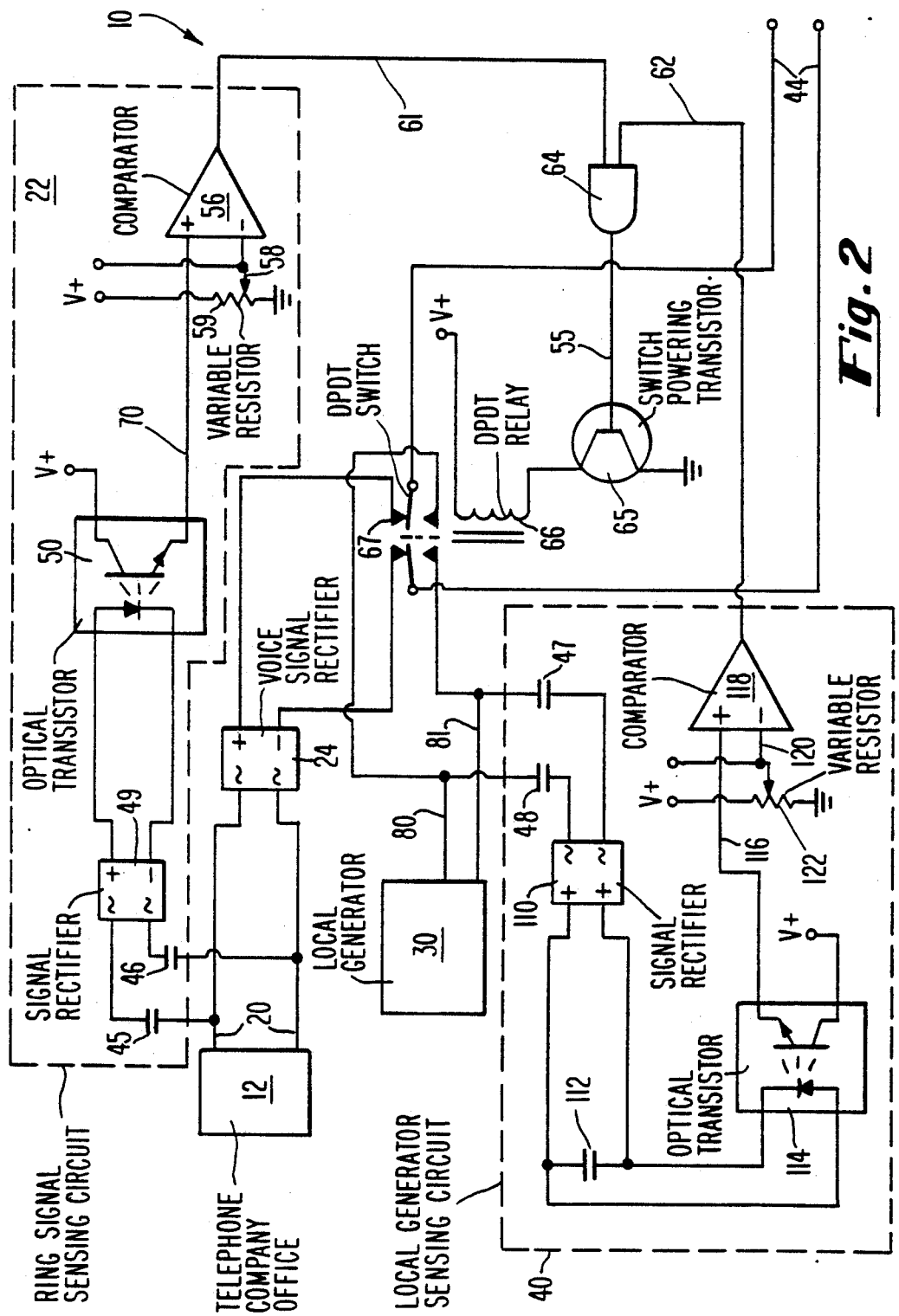
FIG. 2 is a semi-schematic circuit diagram of a presently preferred embodiment of the present invention of FIG. 1.

FIG. 2 shows a more detailed schematic diagram of the multiple phone ring boost circuit 10 according to the present invention shown in FIG. 1. The incoming signal from the telephone company 12 enters through line leads 20. After entering ring signal sensing circuit 22, the AC component of the signal is split off through a pair of capacitors 45 and 46.

The incoming signal is rectified by a signal rectifier 49 and then fed to an optical transistor 50 which produces a differential signal being the difference in voltage of the signal across the outputs of signal rectifier 49. The optical transistor 50 isolates the line leads 20 from the subscriber leads 44 thereby protecting persons and equipment connected to the subscriber leads 44. An output of the optical transistor 50 passes to a first input 70 of a comparator 56 capable of creating a two-state output, the first state being 'high' and the second state being 'low'.

A second input to the comparator 56 is an output lead 58 of a variable resistor 59 which is held between 5 volts and ground. The purpose of the variable resistor 59 is to provide for manual adjustment of the sensitivity of the comparator 56. Variable resistor 59 acts as a trim resistor allowing for adjustment of the ring signal sensing circuit 22 to allow for detection of differing intensity ring signals from telephone company 12. Variable resistor 59 is typically adjusted when the multiple phone ring boost circuit 10 is installed, or when subscriber phones 32, 34 are added or removed.

The comparator 56 outputs a 'high' signal on line 61 when the rectified DC voltage at the first input 70 of comparator 56 is greater than the reference voltage set by the variable resistor 59. This indicates that a ring signal has been received which is greater than the preset reference voltage determined by variable resistor 59.

The local generator 30 is capable of creating a trigger signal similar to the ring signal sent by the telephone company 12 is powered from line current (not shown). The output of the local generator 30 is fed both into two input poles of a DPDT switch 67, and also through capacitors 47, 48, to the generator sensing circuit 40. The local generator 30 has a pair of output leads 80, 81, and is sensitive to the resistance placed across the output leads 80, 11. As the resistance drops across the output leads 80, 81, an increased load is placed on the local generator 30 causing it to overdrive. When the local generator 30 is overdriven, it outputs the second trigger signal having a reduced amplitude and altered waveform. The subscriber telephones 32, 34, affect the resistance across the output leads 80, 81, when the local generator 30 is connected to the subscriber telephones 32, 34. When at least one of the receivers 33 or 35 are lifted off of their respective switch hook 37 or 39, the telephone 32 or 34 exhibits a lessened resistance, causing local generator 30 to overdrive, and produce the second signal.

The generator sensing circuit 40 monitors the output of the local generator 30 in a similar manner as the ring signal sensing circuit 22 monitors the line leads 20, setting its output line 62 'high' when it senses a first trigger signal from the local generator 30, and 'low' otherwise.

In FIG. 2 is illustrated in more detail the preferred structure of the generator sensing circuit 40 according to the present invention. The generator sensing circuit 40 as shown includes the pair of capacitors 47 and 48 in connection with a signal rectifier 110. The signal rectifier 110 is connected to a filtering capacitor 112 which is connected to an optical transistor 114. The optical transistor 114 in turn is connected to a first input 116 of a comparator 118, preferably of the operational amplifier type. The comparator 118 includes a second input 120 which is in connection with a variable resistor 122. The output of the comparator 118 is passed via the line 62.

In operation of the generator sensing circuit 40, the capacitors 47 and 48 receive the trigger signal from the local generator 30 and output the AC component of the trigger signals to the signal rectifier 110. The signal rectifier 110 rectifies this trigger signal to a DC value, and then outputs through the filtering capacitor 112 and to the optical transistor 114. The optical transistor 114 isolates the ring generator 30 from the rest of the circuit and outputs to the first input 116 of the comparator 118. The comparator 118 outputs a 'high' signal over the line 62 when the rectified DC voltage at the first input 116 is greater than a reference voltage set by the variable resistor 122 at the second input 120; otherwise the comparator will output a "low" signal. The variable resistor 122, similar to that described above in relation to the variable resistor 59, is held between 5 volts and ground and operates as a trim resistor which allows adjustment of the generator sensing circuit 40 in order to enable detection of differing intensity trigger signals received from the local generator 30. The variable resistor 122 typically is adjusted when the telephone receivers 33, 35 are on the respective switch hooks 37, 39.

The output line 61 of the ring signal sensing circuit 22 and the output line 62 of the local generator sensing circuit 40 are both fed into a logical "AND" gate 64. When the logical "AND" gate 64 receives a 'high' signal on both lines 61, 62 it sets its own output line 55 'high' biasing the base of a switch powering transistor 65. Switch powering transistor 65 then powers a DPDT relay 66 of the DPDT switch 67. When switched, local generator 30 is connected through the DPDT switch 67 to the subscriber leads 44, connecting the local generator 30 to the telephones 32, 34 connected to the subscriber leads 44.

When line 62 is 'low' indicating that there is no ring signal being received on-line leads 20, or there is a pause between rings, the "AND" gate 64 sets output line 55 'low'. When the line 61 is 'low' indicating that the local generator 30 is not functioning properly, or subscriber telephone receivers 33, 35 are lifted off their respective hooks 37, 39, the "AND" gate 64 sets line 55 'low'. In this condition, DPDT relay 66 is not activated and DPDT switch 67 remains in the first position, connecting line leads 20, through a voice signal rectifier 24, through DPDT switch 67 to subscriber leads 44. In the first position the local generator 30 is not on-line with the subscriber line 44.

The present invention may be adapted to function with multiple input lines from the telephone company 12, or a multiplex office line system connected to the subscriber leads 44 without departing from the spirit or essential attributes of the invention Alternative embodiments exist and reference should be made to the appended claims rather than to one embodiment of the invention.

I claim:

1. A multiple phone ring boost circuit for ringing at least one subscriber telephone on a subscriber line synchronously with a ring signal received from at least one incoming telephone line, each subscriber telephone having a switch hook having a connect and a disconnect state, the boost circuit comprising;

a ring signal sensing circuit for monitoring the incoming telephone line, the ring signal sensing circuit having a two-state output, the first state being produced when a ring signal is received on the incoming telephone line, and the second state being produced when no ring signal is being received;

a local generator producing a first trigger signal when the switch hooks of all of the subscriber telephones are in the disconnect state, and the local generator producing a second trigger signal when the switch hook of at least one subscriber telephone receiver is in the connect state;

a lock generator sensing circuit having a two-state output and monitoring the output of the local generator, the first state being produced when the first trigger signal is being produced by the local generator, and the second state being produced when the second trigger signal is being produced by the local generator or when no trigger signal is being produced by the local generator, the generator sensing circuit comprising: an adjustable generator reference voltage means for producing a generator reference voltage, a generator signal rectifier converting the signals produced by the local generator to a rectified generator signal, and a generator comparator having at least two inputs, the rectified generator signal being fed to the first input, and the generator reference voltage being fed to the second input, the generator comparator producing a first state output when the value of the second input exceeds the value of the first input, and a second state output when the value of the first input exceeds that of the second input;

a switching means adapted to being switched between a first position for connecting the at least one incoming telephone line to the subscriber line, and a second position for connecting a local generator output to the subscriber line;

a control circuit switching the switching means to the second position when both the ring signal sensing circuit and the local generator sensing circuit produces its respective first state outputs, the control circuit switching the switching means to the first position when either the ring signal sensing circuit or the output of the local generator sensing circuit produces its respective second state outputs.

2. A multiple phone ring boost circuit as claimed in claim 1 wherein the ring signal sensing circuit comprises:

an adjustable ring reference voltage means producing a ring reference voltage, a ring signal rectifier converting an alternating current signal received from the incoming telephone line to a rectified ring signal, a ring comparator having a first input and a second input, the rectified ring signal being fed tot he first input and the ring reference voltage being fed to the second input, the ring comparator producing the first state output when the value of the first input exceeds that of the second input, and the second state output when the value of the second input exceeds that of the first input.

3. A multiple phone ring boost circuit as claimed in claim 1 further comprising an electrical isolation means limiting the maximum voltage transferred from the incoming telephone line to the subscriber line.

4. A multiple phone ring boost circuit as claimed in claim 1, wherein the switching means comprises a semiconductor switching means.

5. A multiple phone ring boost circuit as claimed in claim 2, wherein the ring comparator comprises an operational amplifier comparator.

6. A multiple phone ring boost circuit as claimed in claim 1, wherein the generator comparator comprises an operational amplifier comparator.

7. A multiple phone ring boost circuit as claimed in claim 1, further comprising a voice signal rectifier having an input connected to the incoming telephone line, and an output connected to the switching means, rectifying a signal received at the voice signal rectifier input, and producing the rectified signal at its output.

* * * * *

UNITED STATES PATENT OFFICE
CERTIFICATE OF CORRECTION

Patent No. 5,233,649    Dated   August 3, 1993

Inventor(s)   Roy H. Guerra, Jr.

It is certified that error appears in the above-identified patent and that said Letters Patent is hereby corrected as shown below:

Col. 2, line 23, delete one "size"

Col. 5, line 25, after "44" insert --,--

Col. 5, line 56, "11" should be --81--

Col. 8, line 21, "tot he" should be --to the--.

Signed and Sealed this

Twenty-sixth Day of April, 1994

*Attest:*

BRUCE LEHMAN

*Attesting Officer*    *Commissioner of Patents and Trademarks*